Patented Sept. 8, 1942

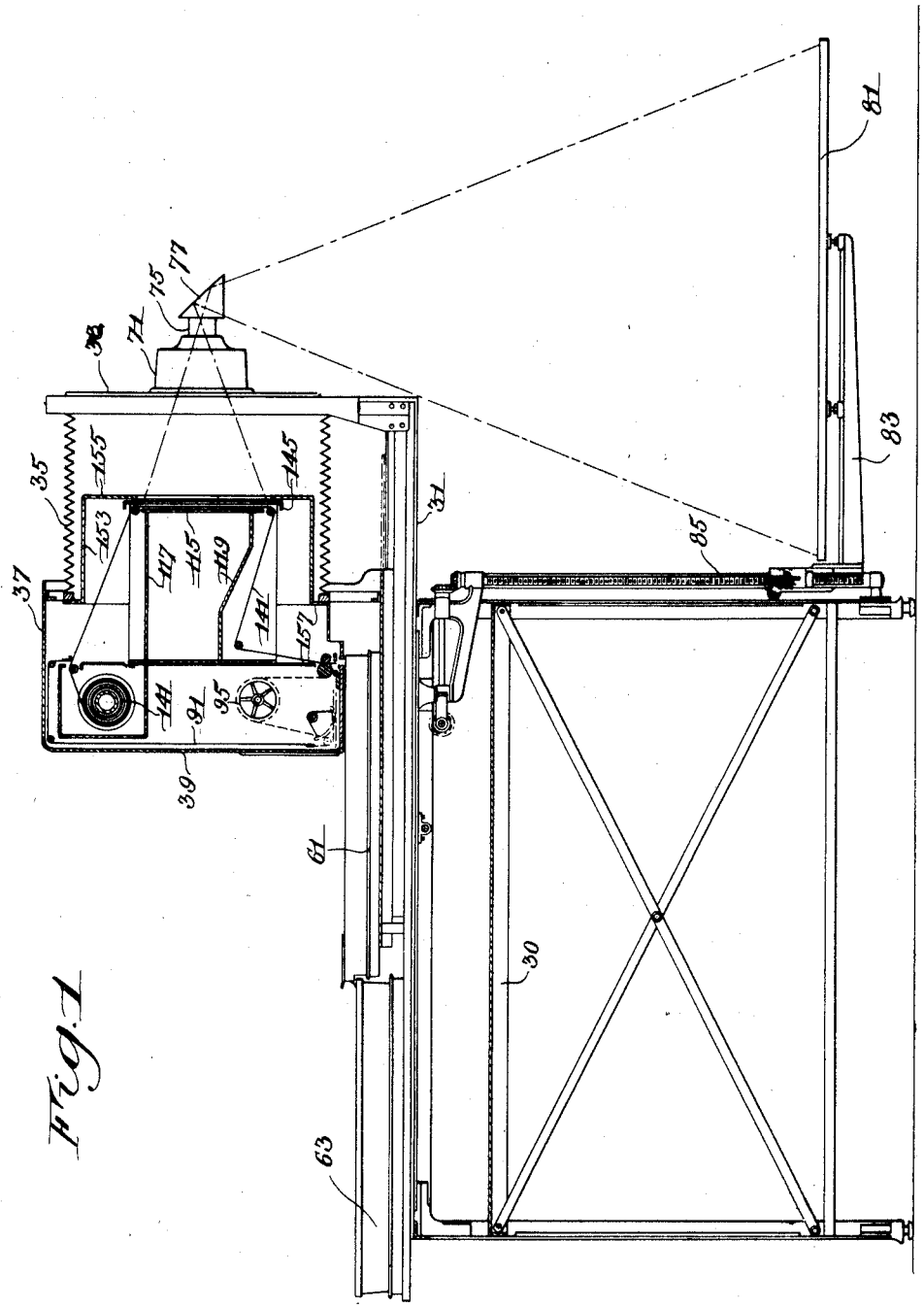

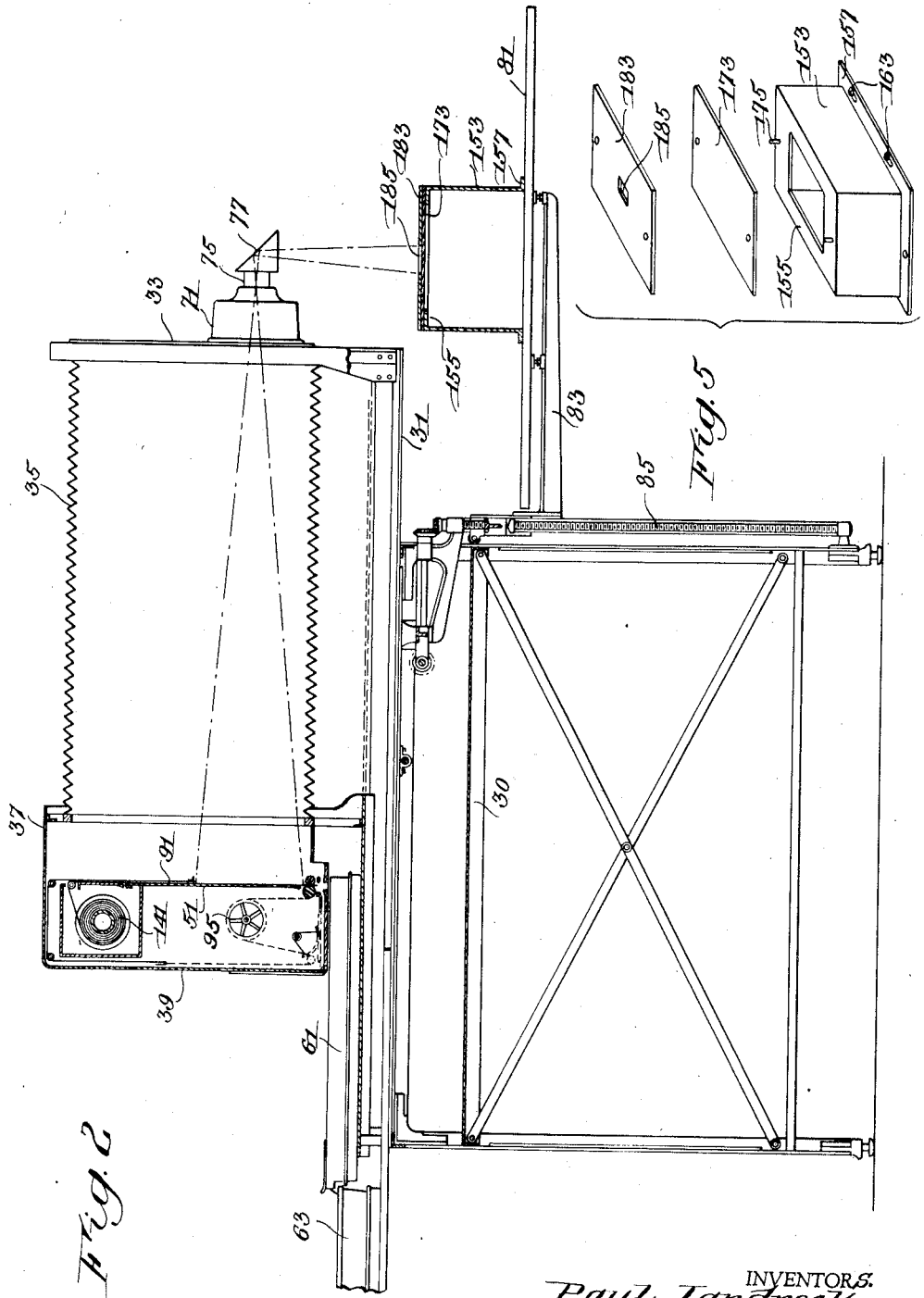

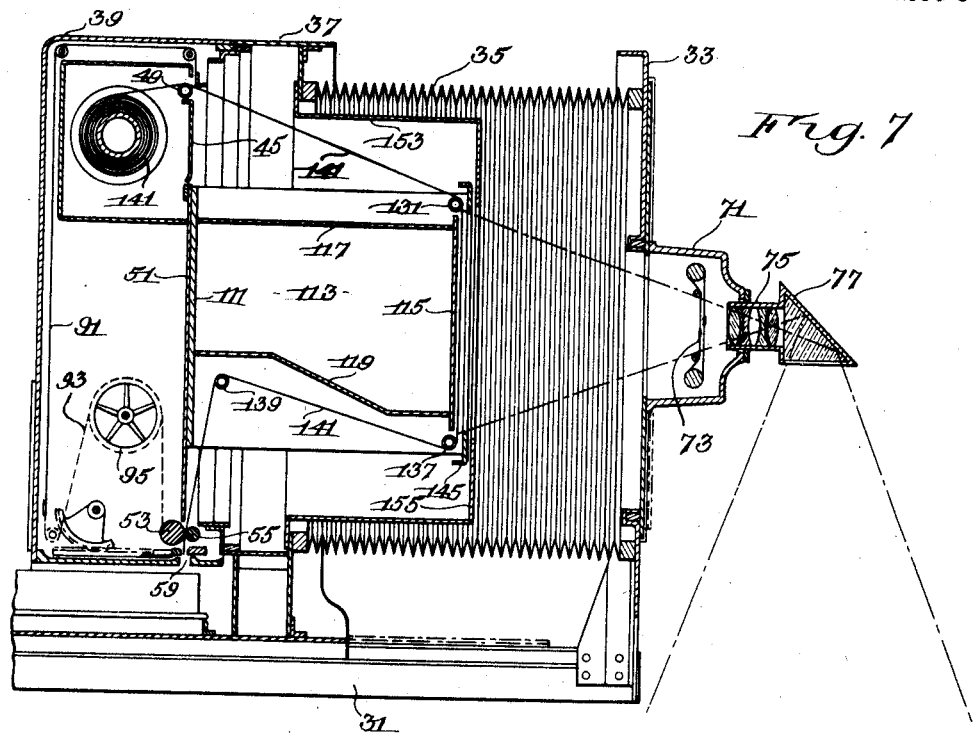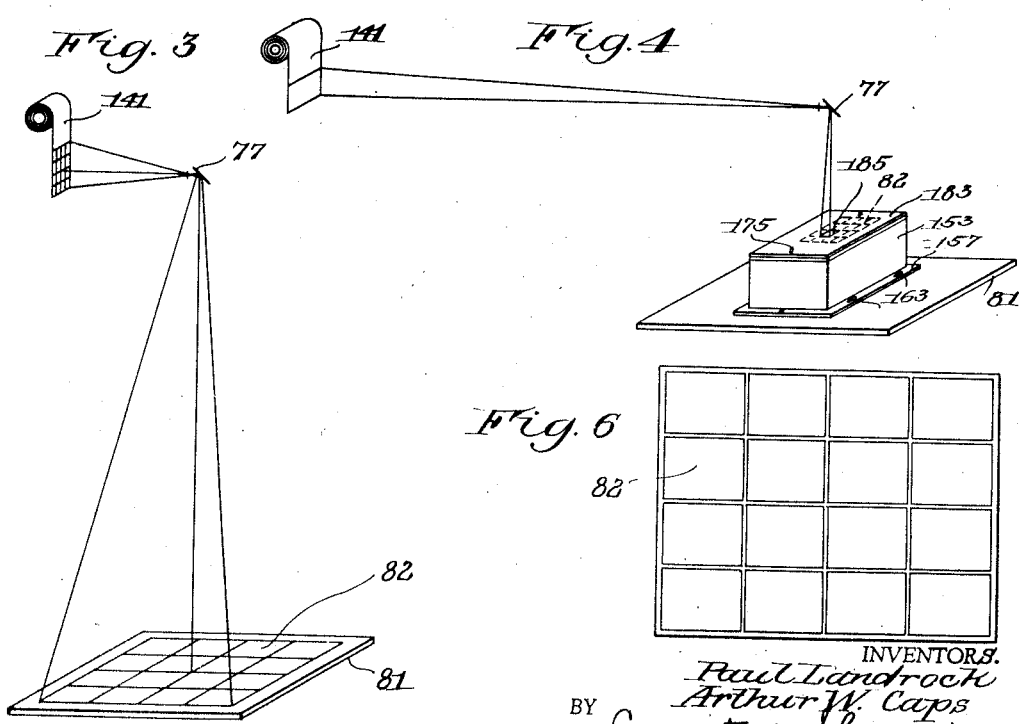

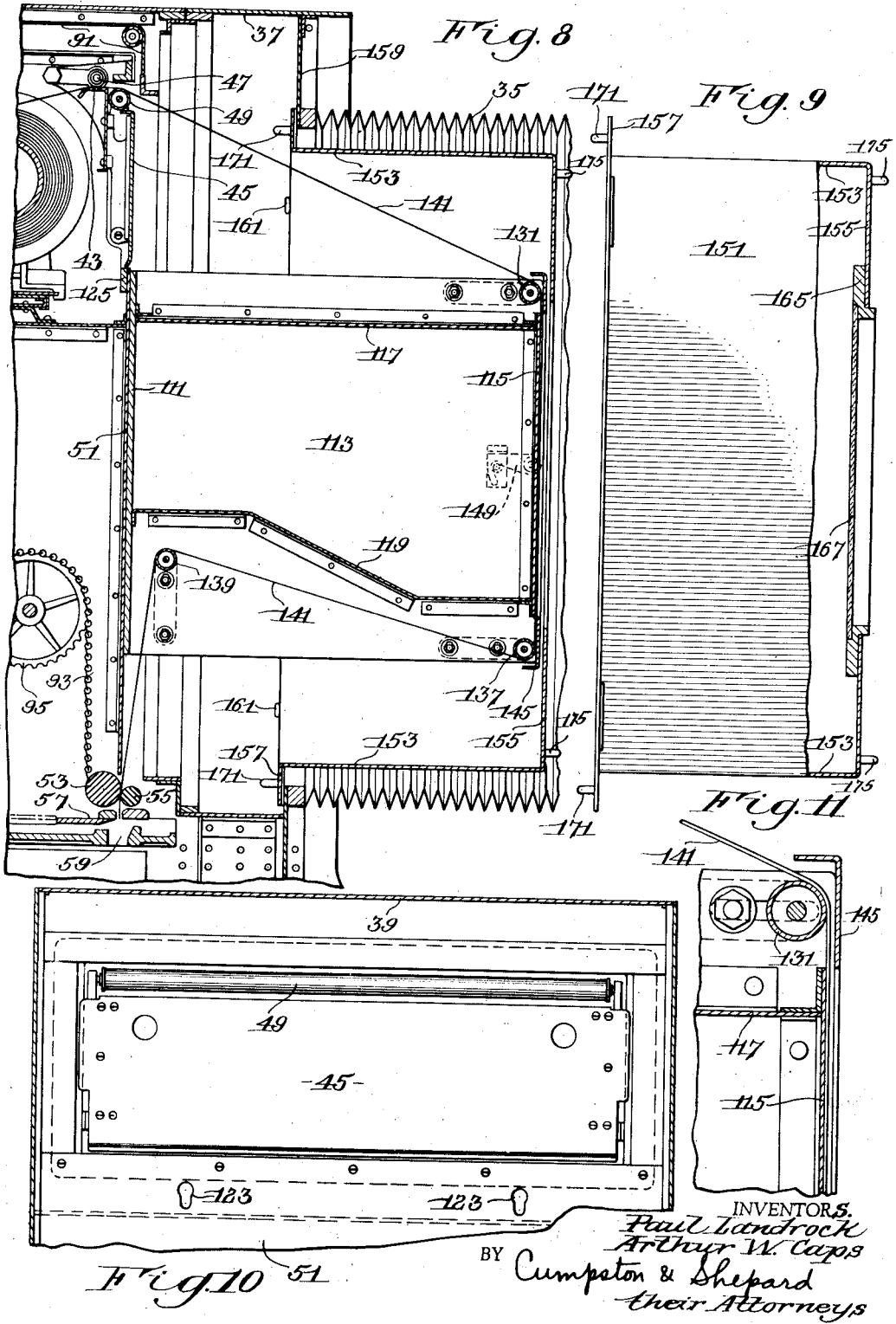

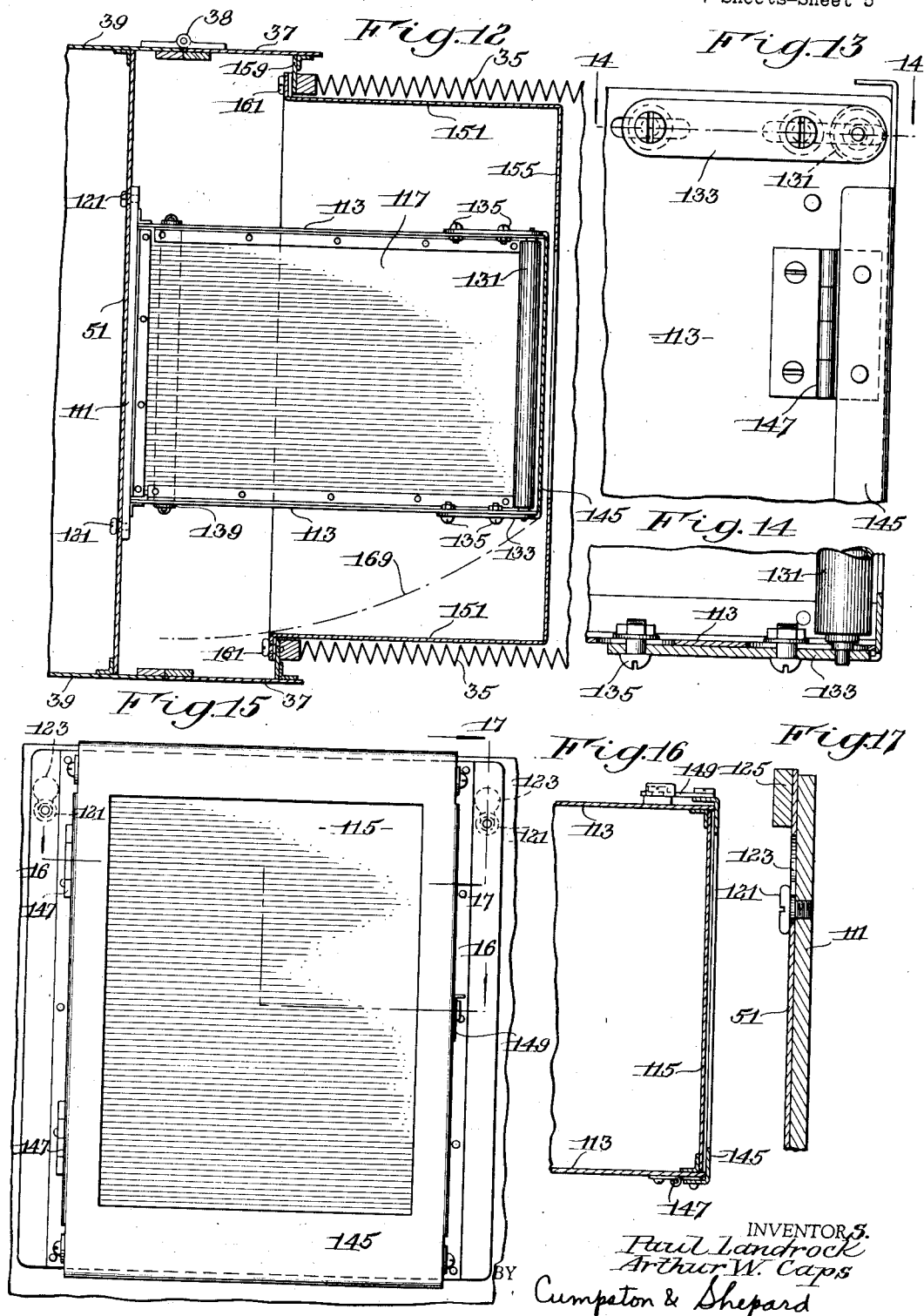

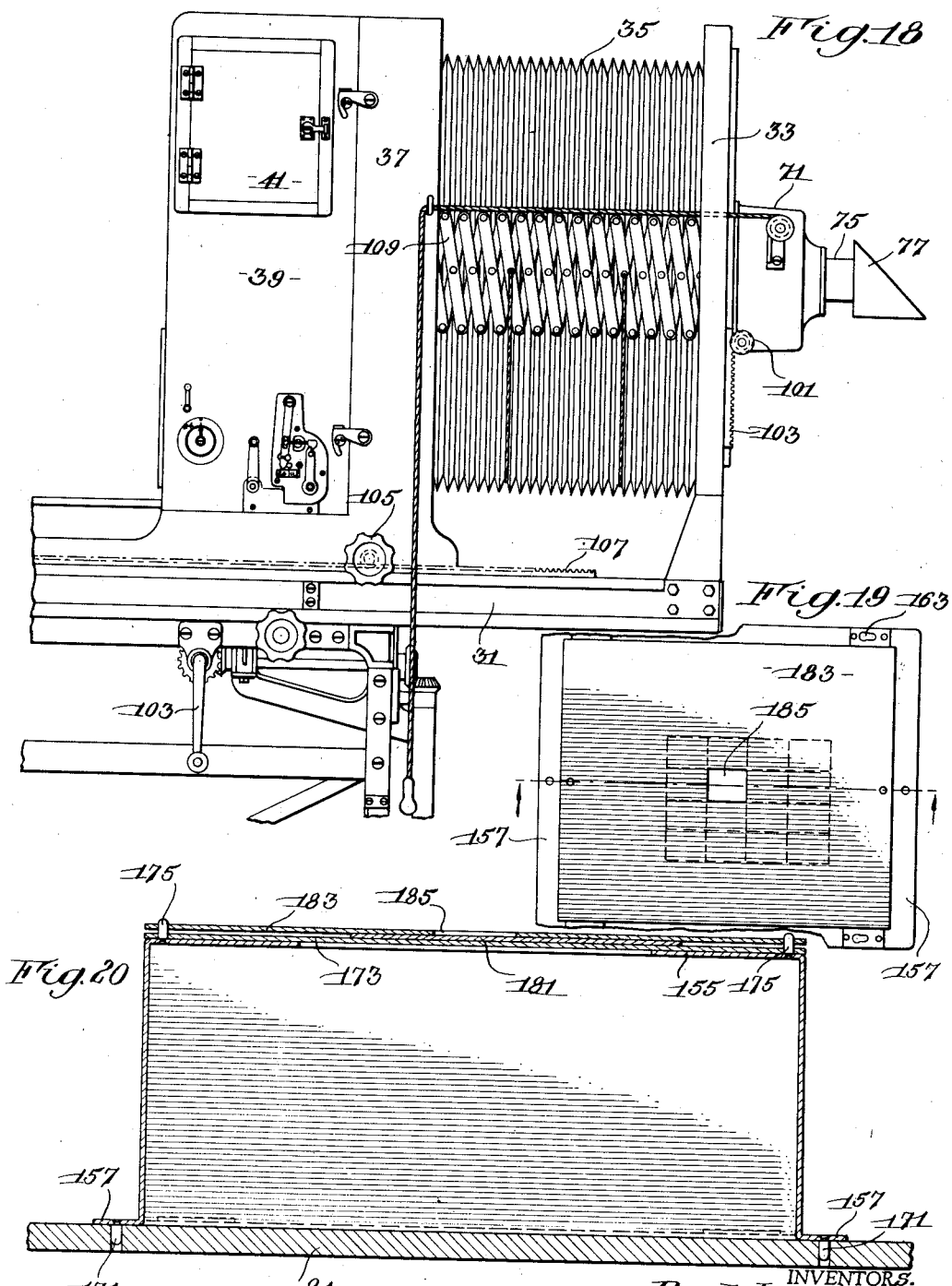

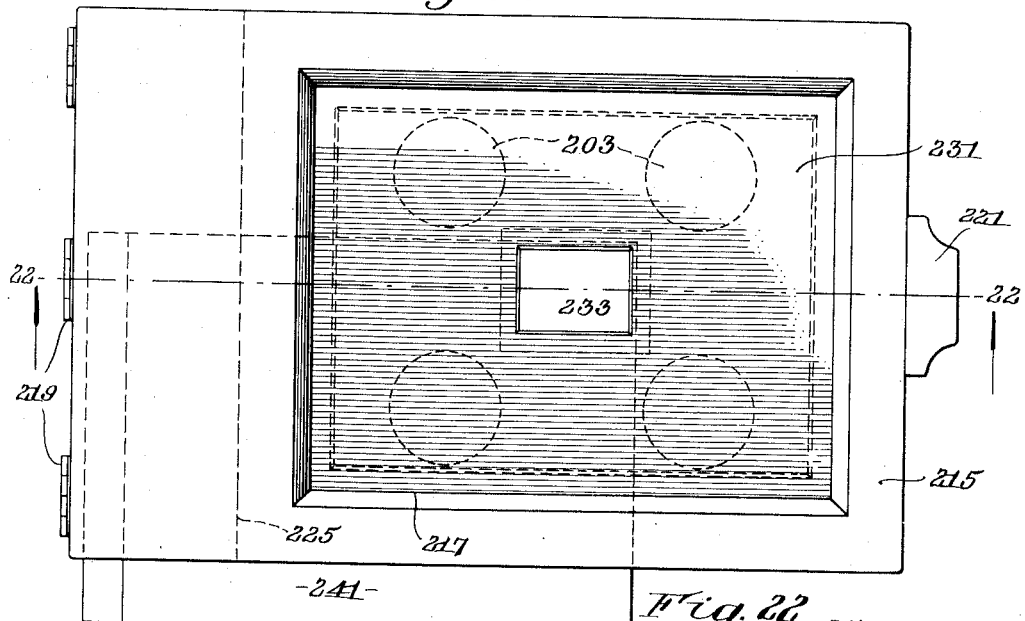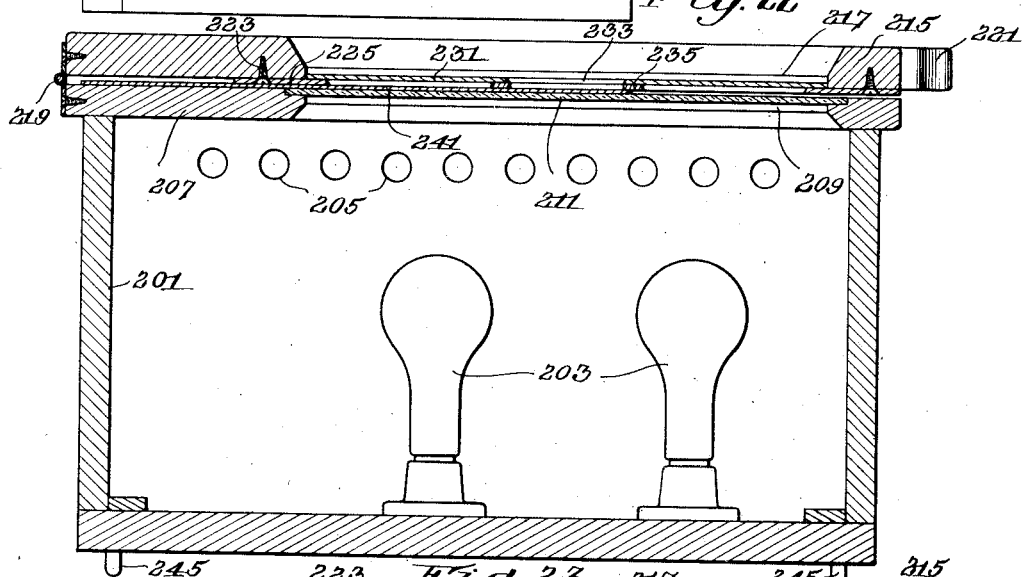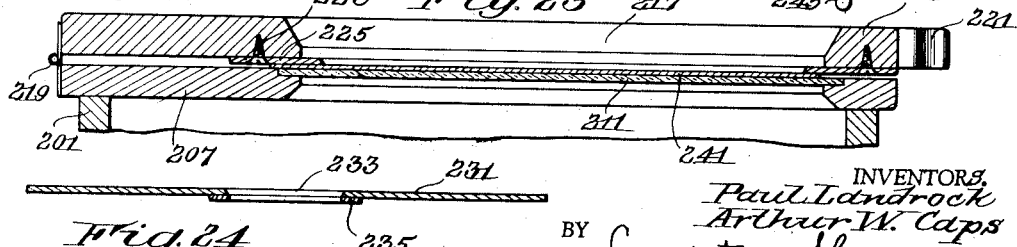

2,294,992

UNITED STATES PATENT OFFICE 2,294,992

PHOTOCOPYING APPARATUS

Paul Landrock and Arthur W. Caps, Rochester, N. Y., assignors to Photostat Corporation, Providence, R. I., a corporation of Rhode Island Application January 4, 1941, Serial No. 373,122

14 Claims. (Cl. 88—24)

The present invention relates to photographic cameras of the type known as commercial cameras or photocopying machines. Such cameras are designed to make photographic reproductions of documents or other subjects, the cameras usually being adjustable to make reproductions either of full size, or enlargements, or reductions, as desired.

In many such cameras, the range of adjustment is limited to such an extent that reduced size reproductions can not be made less than about one-half size or 50% of the size of the original which is being copied, and enlargements can not be made larger than about twice the size or 200% of the size of the original being copied. These limitations render it impossible to make, in a single direct operation, a reproduction which is only one-quarter the size or 25% of the size of the original, or a reproduction which is four times the size or 400% of the size of the original. Yet such 25% and 400% reproductions are highly desirable in many circumstances, particularly when letters or other documents are to be preserved by what may be called the miniature filing system or "minifile" system.

In the miniature filing system, the letters to be preserved for permanent filing are preserved in the form of photographic copies 25% of the size of the original letter, so that a reproduction of sixteen letters on ordinary letter-size sheets can be made on a single photographic print the same size as an ordinary letter sheet, which print may be called a "master sheet" or "master print." Then the original letters may be discarded if desired, and the photographic print or master sheet containing a reproduction of the sixteen letters may be kept in the files, taking up only one-sixteenth as much room as the originals which it replaces. Yet the reproductions can be read, or at least partly read sufficiently for purposes of identification, by the naked eye without the aid of a magnifying glass or a reading machine. When a copy of a particular letter is wanted for further use, it is located as one of the sixteen letters reproduced on a single letter-size photographic print or master sheet, and then an enlarged photographic reproduction is made of this one letter (omitting the other fifteen letters on the same master sheet) on a scale of four times the size or 400% of the size of the miniature print, so that the final reproduction is the same size as the original letter which was photographically reproduced in miniature on the master sheet.

The miniature filing system is also useful in filing copies of drawings, maps, pages of books, etc., and is by no means limited to filing copies of letters, but will be described in connection with letters for the sake of a convenient example.

The great advantages of this miniature filing system will be readily apparent to those who have given serious thought and study to filing systems, particularly to the filing of very large numbers of letters and documents. Yet this minature filing system has not come into general use by large organizations, for the reason that the commercial cameras or photocopying machines already possessed by many of such large organizations have not been able to make the master sheet containing the sixteen miniature reproductions, in a single photographic operation from the sixteen originals, and have not been able to reproduce any one of the sixteen reproductions on the master sheet on the desired 400% scale, in a single photographic operation, due to the ratio limitations of the commercial cameras or photocopying machines already largely in use.

As a makeshift, it has been possible to reproduce four letters on a single sheet, at half size or 50% size of the originals, and then to lay four of such 50% sheets together and photograph them on a single photographic print, again at 50% size, thus finally making a master sheet with sixteen reproductions of 25% size. But it will be observed that five separate photographing operations are necessary to reproduce the master sheet by this makeshift method; that is, one operation for making each of the four intermediate sheets of 50% size, and then a fifth operation to photograph these four intermediate sheets to make the final master sheet of 25% reproducttions. At least two photographic operations have been necessary to produce a 400% print of any one of the 25% reproductions on the master sheet. These makeshift methods have obviously been too cumbersome, too time consuming, and too expensive to make the miniature filing system, with all its advantages, commercially acceptable for practical use on a large scale.

An object of the present invention is the provision of attachments or accessory parts which may be used with commercial cameras or photocopying machines of standard known construction, to enable such machines to make 25% prints and 400% prints, each by a single photographing operation, thus making the miniature filing system sufficiently speedy, simple, and inexpensive so that it may be adopted as a practical matter by those who desire its advantages.

Another object is the provision of such attachments or accessories in such form that they may be easily applied in the field to cameras already in use, without the necessity for returning such cameras to the factory.

A further object is the provision of the necessary attachments or accessories in a light, compact, convenient, and inexpensive form.

A still further object is the provision of improved means for holding a subject to be photographed on an enlarged scale, and especially for holding a subject while illuminating it by transmitted light rather than reflected light.

To these and other ends the invention resides in certain improvements and combinations of parts, all as will be hereinafter more fully described, the novel features being pointed out in the claims at the end of the specification.

In the drawings:

Fig. 1 is a somewhat diagrammatic vertical section taken longitudinally through a commercial camera equipped with the attachments of the present invention, the parts being in position for making a 25% reproduction of the originals, this being the position of the camera parts when making a master sheet containing, for example, miniature reproductions of sixteen original letters or pages;

Fig. 2 is a similar diagrammatic section with the parts rearranged and adjusted for making a 400% reproduction, this being the position assumed by the parts when any one of the sixteen miniature reproductions on a master sheet is to be reproduced at four times the scale of the miniature reproduction, so as to be the same size as the original letter or page;

Fig. 3 is a perspective diagram corresponding to Fig. 1 and likewise illustrating the making of the 25% reproduction or master sheet from sixteen original letters or pages;

Fig. 4 is a similar perspective diagram corresponding to Fig. 2 and likewise illustrating the making of a 400% reproduction;

Fig. 5 is an exploded perspective view of certain parts of the apparatus used as a copy holder for holding the master sheet while a 400% reproduction of a portion thereof is being made;

Fig. 6 is a diagrammatic face view of one of the master sheets containing miniature reproductions of sixteen original sheets or letters;

Fig. 7 is a vertical section taken longitudinally through a portion of the camera with the parts in the same relative positions as in Fig. 1, but on a larger scale to illustrate more details;

Fig. 8 is a similar view of a portion of the mechanism shown in Fig. 7, on a still larger scale, illustrating additional details of construction;

Fig. 9 is a side elevation, with parts broken away and parts in vertical section, of a masking box shown in Figs. 7 and 8, with a focusing screen in place therein;

Fig. 10 is a face view of a portion of the focal plane support and other parts shown in Fig. 8;

Fig. 11 is a vertical section through the upper front corner of the focal plane extension element shown in Figs. 7 and 8;

Fig. 12 is a horizontal section through the portion of the camera shown in Fig. 8, illustrating the focal plane extension element in plan;

Fig. 13 is a side elevation of the upper front corner of the focal plane extension element;

Fig. 14 is a horizontal section taken substantially on the line 14—14 of Fig. 13;

Fig. 15 is a front elevation or face view of the focal plane extension element;

Fig. 16 is a horizontal section taken substantially on the line 16—16 of Fig. 15;

Fig. 17 is a vertical section taken substantially on the line 17—17 of Fig. 15;

Fig. 18 is a side elevation of part of the camera;

Fig. 19 is a plan of the copyholder shown also in Fig. 5, for holding the master sheet when a reproduction of a portion thereof is to be made;

Fig. 20 is a vertical section taken centrally through the copyholder of Figs. 5 and 19;

Fig. 21 is a plan of an alternate form of copyholder;

Fig. 22 is a vertical section taken substantially on the line 22—22 of Fig. 21;

Fig. 23 is a section similar to the upper part of Fig. 22, with a supplemental mask removed to show a larger area of the subject being copied, and Fig. 24 is a vertical section taken centrally through a supplemental mask.

The same reference numerals throughout the several views indicate the same parts.

Referring now to Figs. 1 and 2 of the drawings, there is shown a commercial camera or photocopying machine of known construction, such for example as one style or model of commercial camera widely sold by the assignee of the present application under the trade-mark "Photostat." Such a camera includes a supporting framework indicated in general by the numeral 30 and adapted to stand upon the floor, this framework including horizontal members 31 carrying at their forward ends a camera front 33 connected by bellows 35 to a camera body or back section 37 slidable along the horizontal members 31 for purposes of focusing. Hinged along one side to the rear of the body section 37 by hinges 38 (Fig. 12) is a magazine section 39 containing a roll box having at one end a door 41 (Fig. 18) which may be opened for insertion of a fresh roll of sensitized sheet material or film, usually in the form of a strip of paper coated with a light-sensitive emulsion.

As best seen in Fig. 8, the strip of sensitized paper extends from the supply roll forwardly, over a brake plate 43 mounted near the upper part of a hinged wall 45, and under a roller 47 pressing the paper downwardly onto the brake plate 43 to create a desired amount of tension or frictional drag in the paper. After passing this braking or tensioning mechanism, the paper passes over a roller 49 at the top edge of the hinged wall 45, and when using the normal focal plane of the machine, the paper passes thence downwardly over the front face of the hinged wall 45 and over another wall 51 which forms a vertical downward prolongation or extension of the wall 45, and down between a pair of feeding rollers 53 and 55 below which the strip of sensitized paper is subjected to the action of a movable severing knife 57.

Further details of the construction of the roll box and associated parts, and the manner in which the sensitized paper is threaded from the supply roll across the focal plane of the camera, may be seen from the disclosure of Landrock Patent 2,142,853, granted January 3, 1939.

Below the knife 57 is a slot 59 through which the film may extend, and below and to the rear of this slot is any suitable form of print treating or developing apparatus. In some forms of commercial cameras, the print treating apparatus may be a relatively shallow and horizontally extending developing tank or tray as here shown diagrammatically at 61, the details of construction of which may, for example, be of the form shown in Landrock Patent 1,824,281, granted September 22, 1931. From this developing tank, an exposed and developed print is withdrawn by hand and placed in a washing bath 63 preparatory to being placed in any suitable fixing bath.

In still other forms of commercial cameras, the exposed photographic print, after being cut off from the remainder of the strip by operation of the severing knife 57, is picked up by conveying mechanism of one form or another and is conveyed automatically into and through the developing, washing, and fixing baths, in a manner shown for example in Greene Patent 1,890,325, granted December 6, 1932, or in Caps and Greene Patent 1,824,259, granted September 22, 1931. The details of the manner in which the print is treated after being exposed are immaterial so far as the present invention is concerned.

The camera front 33 is provided with a shutter, lens, and prism assembly including a housing 71 (Figs. 1, 2, and 7) which contains a photographic shutter of any suitable type such as the curtain shutter 73, and a lens tube 75 for holding a suitable lens system, the forward end of the tube carrying a prism 77. These parts are all well known parts of commercial copying cameras. The lens tube and prism together form an assembly which is detachable from the shutter housing 71 and may be replaced by another assembly containing a lens system of different focal length.

In the normal use of the ordinary commercial copying camera (without the accessories and attachments of the present invention) the letters, documents, or other subjects to be copied are placed upon a suitable subject-holder or copyholder arranged approximately horizontally, such as the copy board 81 (Figs. 1 and 2) mounted on a bracket 83 extending forwardly from and slidable upwardly and downwardly along guide rails 85 secured to the frame 30. The subjects placed on the holder 81 are suitably illuminated, usually by artificial lights placed alongside the holder. When the camera shutter 73 is opened, light rays from the subject on the holder 81 pass upwardly to the prism 77, thence are bent and reflected rearwardly through the lens system in the tube 75, through the bellows of the camera, and fall onto the expanse of sensitized paper stretched in the focal plane of the camera, that is, extending from the roller 49 straight downwardly across the front surfaces of the members 45 and 51 to the feeding rollers 53 and 55.

If a small print is to be made, using only part of the area of the sensitized paper stretched in the focal plane, a movable curtain 91 (Fig. 7) connected to and operated by chains 93 (Fig. 8) running over sprockets 95 and over suitable idler sprockets or rollers, may be employed to block off or mask the upper part of the sensitized film in the focal plane, in a manner disclosed in greater detail in connection with Fig. 2 of the drawings of Caps Patent 1,802,194, granted April 21, 1931. By turning a knob 101 (Fig. 18) connected to pinions engaging a rack 103, the housing 71 mounted on the camera front 33 may be moved downwardly from its approximately central position shown in Figs. 7 and 18, to a somewhat lower position such as shown in Fig. 1, in order to center the image on the lower part of the sensitized sheet in the focal plane, when the upper part has been blocked off by the curtain 91.

The copy board 81 may be raised or lowered by turning a handle 103 (Fig. 18) connected by suitable gearing to a feed screw, while the camera back and magazine section 37, 39 may be moved closer to or farther from the front 33, for purposes of focusing, by turning a knob 105 (Fig. 18) connected to pinions engaging racks 107 mounted on the stationary horizontal frame members 31.

The parts thus far described are well known to those skilled in the art of commercial cameras or photocopying machines, particularly to those familiar with "Photostat" machines, and operate in the usual manner.

*Attachments for making reduced prints*

The limitations of a commercial camera of the above type, in making reductions or enlargements, are usually about 50% to 200%, as above stated. These limitations arise from the limited extent to which the copyholder 81 may be moved upwardly or downwardly, together with the limited extent to which the back and magazine sections 37 and 39 may be moved toward and away from the front 33, and the limitations imposed by the focal length of the lens system used.

In making prints of reduced size, the maximum amount of reduction is limited by the distance to which the copy board 81 may be moved downwardly away from the prism, and the extent to which the focal plane may be brought forwardly toward the lens and prism assembly, even assuming the use of a lens having a focal length capable of taking advantage of these extreme positions of the parts. The distance to which the copy board 81 may be moved downwardly is limited by the length of the guiding rails 85 along which it moves, and in any event is limited by the distance of the prism above the floor on which the machine frame 30 stands. The distance to which the normal focal plane can be moved forwardly toward the lens and prism assembly is limited by the space necessarily taken up by the bellows 35 even in its most compressed condition, and especially by the space taken up in the most compressed condition of the lazy-tongs 109 (Fig. 18) which is preferably employed to help support the bellows when the latter is in its extended position. Due to these limitations, it is found that in most machines of this type which are already in use in the field, even when the copy board 81 is in its lowest position and when the camera back and magazine sections 37 and 39 are in their most forward position, the camera still will not make reductions much smaller than 50% and will not even closely approach reductions of 25% size, which are desirable for the miniature filing system above explained.

The present invention, therefore, provides, as an attachment or accessory, a simple and compact focal plane extension element which serves to define a supplementary focal plane forwardly of or in advance of the normal or regular focal plane, and sufficiently close to the lens and prism assembly to permit the making of prints of 25% size, when a lens of shorter focal length is substituted for the larger focal length lens usually employed in making standard reproductions. This focal plane extension element is shown in its position of use in Figs. 1 and 7 of the present drawings, and in somewhat greater detail in Figs. 8 and 12 to 17, reference to which is now made.

The extension element is preferably of light sheet metal construction, and includes a back or main plate 111 to which are firmly connected two forwardly extending side plates 113, these side plates being connected to each other by a vertical front plate 115, by a top plate 117, and by a bottom plate 119 spaced somewhat above the bottom edges of the plates 113, as best seen in Fig. 8. These parts make up a roughly rectangular box which is detachably mounted on the main focal plane plate 51 of the magazine section of the camera, by providing a pair of headed studs 121 projecting rearwardly from the plate 111 to engage in a pair of keyhole slots 123 (Fig. 10) cut in the plate 51 near its upper edge where the plate is strongly reinforced by the cross bar 125 (Figs. 8 and 17) and by the bottom plate of the roll box. The focal plane extension element or box hangs entirely from these two headed studs 121 engaged in the keyhole slots, and it is but the work of an instant to connect or disconnect the extension element.

The focal plane extension element further includes a guide roller 131 (Figs. 8 and 11 to 14) near the upper forward corner of the extension element, the ends of the guide roller being mounted in links 133 adjustably held on the side plates 113 by screws 135 passing through horizontal slots in the side plates, allowing accurate adjustment of the guide roller to secure it in true position. A similar guide roller 137 (Fig. 8) similarly adjustably mounted, is provided at the lower front corner of the extension element. A third roller 139 (Fig. 8) is provided near the rear edge of the extension element, somewhat above the bottom thereof, as shown. This roller 139 is also mounted on links adjustable in the same manner on the side plate 113, but in this case the slots in the plate 113 extend vertically so that the adjustment is in a vertical direction.

When this focal plane extension element is to be used, then instead of running the sensitized sheet material down across the front face of the members 45 and 51 (Fig. 8) in the normal focal plane, direct from the roller 49 to the feed rollers 53 and 55, the sensitized sheet material is threaded in the position shown at 141 in Fig. 8, extending from the roll box guide roller 49 obliquely downwardly and forwardly to the guide roller 131, thence vertically downwardly to the roller 137, passing over the front face of and being backed up by the plate 115 which constitutes the supplementary or extended focal plane support. From the guide roller 137, the sensitized sheet material extends rearwardly and somewhat obliquely upwardly to the guide roller 139, and thence downwardly to the feed rollers 53 and 55.

To assist in holding the sensitized sheet material flat on the supplementary focal plane support 115, there is preferably provided a hinged masking member of rectangular cut-out form, to overlie the marginal edges of the material around the picture area or exposure area. This masking member, best seen in Figs. 8, 11, 15, and 16, is indicated at 145, and one lateral edge thereof is hinged at 147 to one of the side walls 113 of the extension element, while the other lateral edge is releasably latched to the opposite side wall 113 by the manually operable latch 149. The latch is released and the member 145 is swung to an open position when the sensitized strip 141 is being threaded through the machine, and then the masking member 145 is closed and latched, so that the side strips thereof overlap the side marginal edges of the sensitized sheet and tend to hold it flat against the front face of the focal plane support plate 115, while the top and bottom strips of the mask loosely overlie the front face of the sensitized sheet above and below the exposure area or picture area, and the rectangular opening in the member 145 defines the extent of such picture area. Conveniently the picture area may be approximately 8½ x 11 inches or 9 x 12 inches in size.

It will be seen particularly from Figs. 1 and 7 that when the focal plane extension element is in place in the camera and when the sensitized sheet is threaded over the supplementary focal plane provided by this extension element, such supplementary focal plane is in a position within the bellows 35, quite far forwardly from the normal focal plane defined by the members 45 and 51. In this way, the focal plane is brought sufficiently close to the lens and prism assembly so that reduced prints of 25% size may be made, when copying letters or other subjects laid on the copy board 81 when the latter is in a relatively low position, as shown, for example, in Fig. 1.

In order that stray light entering the camera during an exposure may not reach and fog the portions of the sensitized sheet material 141 extending from the roller 49 to the roller 131 or from the roller 137 to the feed rollers 53 and 55, it is desirable to provide another mask or lighttight partition cutting off access of light to such portions of the sensitized material. This mask is best shown in Figs. 1, 7, 8, 9, and 12, reference to which is now made. It comprises two vertical side walls 151, horizontal top and bottom walls 153, an incomplete front wall 155 in the vertical plane of the forward edges of the top, bottom, and side walls, but having an opening at its center, and a rear wall or flange 157 extending outwardly a short distance from the rear edges of the top, bottom, and side walls. The side of the walls 151 and 153 is such that these walls fit within the rectangular cross sectional space formed by the bellows 35, while the rear flanges 157 overlap and lie against the rear sides of a partition 159 serving to connect the rear end of the bellows to the top, bottom, and side walls of the body portion 37. A detachable connection is provided between the flange 157 and the partition 159, such connection preferably taking the form of four headed studs 161 projecting rearwardly from the partition 159, engageable with corresponding keyhole slots 163 (Fig. 19) formed in the flange 157 and in small reinforcing plates fixed to the flange.

The opening in the front wall 155 of the masking box is rectangular and is slightly larger than the opening or cut-out in the masking screen 145, as seen in Fig. 8. The wall 155 lies just in front of and almost in contact with the screen 145, and the parts are preferably finished with black or other light-absorbent surfaces, so that the masking box effectively prevents stray light, entering the camera during an exposure, from reaching the undesired portion of the sensitized sheet material.

Focusing scales may be provided in conjunction with the copyholder 81 and with the camera back and magazine section, to indicate the proper setting of the parts for making a reduced print of any desired size, such as 25% size. If no such scales are provided, and in some cases even with the provision of such scales, it is desirable to be able to focus the camera by actual trial with a focusing screen, and so there may be provided a wooden or metal frame 165 (Fig. 9) fitting snugly in and held frictionally in the opening in the front plate 155 of the masking box, this frame 165 carrying a ground glass or similar translucent plate 167, which, when in proper position, occupies exactly the same plane as the portion of the sensitized sheet material on the front face of the supplementary focal plane support 115 would occupy. The focusing screen 167 is employed, of course, only when the magazine 39 is opened up on its hinges 38 and swung back from the body 37, thus carrying the focal plane extension element bodily back and out of the masking box so that the parts are opened up and the operator may readily view the focusing screen 167 for focusing purposes. When the magazine 39 swings on its hinges, the corner of the focal plane extension element which is most remote from such hinges swings along the arc indicated at 169 in Fig. 12, and just clears the rear edge of the adjacent side wall 151 of the masking box, as shown.

After focusing is completed, the frame 165 and screen 167 are removed from the opening in the masking box. Then the magazine section may be swung to a closed position, making the camera ready for taking exposures.

When this focal plane extension element is employed, with its associated parts, for making prints of 25% size or similar small size, the sensitized material is wound down after each exposure by operation of the feeding rollers 53 and 55, and the sheet material is cut off after each winding operation by operation of the knife 57, just as in the case of the normal operation of the camera without the focal plane extension element. To avoid wastage of sensitized sheet material, each cut made by the knife 57 should be accurately spaced at or just above the top edge of a particular exposure area which has just been wound down below the knife. Because of the considerable distance between the lower edge of the exposure area on the supplementary focal plane support 115, and the feeding rollers 53 and 55, there must ordinarily be one or more exposure areas, already exposed but not yet cut off, existing at any given time on the film strip 141 between the bottom of the exposure area on the focal plane and the feed rollers. To make the knife cut at the proper point and to avoid cutting destructively across a portion of a given exposure area, the length of the path from the bottom of the exposure area on the focal plane support to the feed rollers is carefully designed so as to be very slightly more than an even multiple of the length of one exposure area. The purpose of placing the guiding roller 139 in the location shown, causing the film strip to pass obliquely upwardly and rearwardly to this guiding roller, is to increase the length of such path sufficiently to satisfy the above condition. The length of such path is preferably just slightly more than two times the corresponding dimension of the picture area plus the desired margins. The adjustability of the guide roller 139 in a vertical direction enables the length of this path to be varied to a limited extent, as may be necessary to insure that the knife cut should come exactly in the desired relation to the successive exposure areas, to provide exactly the desired margins, without needless wastage.

When the machine is prepared for making prints of 25% size, then in addition to installing the focal plane extension element and the masking box above mentioned, the detachable lens and prism assembly 75, 77 is removed from the front of the shutter housing 71 and is replaced by a similar assembly of substantially shorter focal length. For example, if the camera in normal use employs an assembly with a focal length of 21 inches it may be replaced by an assembly having a focal length of, say, 13 inches, to take full advantage of the extreme relative positions of the subject and of the focal plane which are made possible by the focal plane extension element.

*Attachments for making enlarged prints*

The ratio of enlargement which is normally possible on a commercial copying camera of this type, even when using a lens of sufficiently short focal length, is limited by the extent to which the copy board may be brought upwardly toward the prism (which depends on the length of rails 85) and the extent to which the camera back and the focal plane support incorporated therein may be moved rearwardly away from the lens and prism assembly (which depends on the extent to which the bellows 35 may expand and the length of the horizontal rails 31). In the ordinary commercial camera of the type above described, the above limitations are of such character that it is not possible to make prints much in excess of 200% of the size of the originals, and the limitations fall far short of permitting the desirable 400% prints.

Actually, the controlling one of these limitations is found to be the extent to which the copy board 81 may be raised. If the copy to be reproduced could be placed sufficiently close to the prism, the focal plane could be moved far enough rearwardly from the lens and prism to make the desired 400% print, using a lens of the necessary short focal length.

Accordingly, to enable the camera to make 400% prints, the present invention provides a supplementary support which may be placed upon the copy board 81 when the latter is at or near the upper limit of its travel, to hold the copy or subject to be reproduced at an elevation still higher than the copy board 81, thus bringing the subject close enough to the prism to produce the desired enlargement of four times or 400% size. The supplementary support in one of its possible forms is made up partly from the masking box 151, 153, 155 already described, thus decreasing the number of separate parts or accessories required to outfit the machine completely for making both reductions and enlargements. When enlargements are being made, the masking box and the focal plane extension element are not needed inside the camera, so the focal plane extension element is removed and laid aside, while the masking box is removed from the interior of the camera and is placed on the copy board 81 to form, along with other elements, a support for the subject to be copied.

The desired closeness of the prism to the subject being copied is also aided by the fact that when making these 400% enlargements, the shutter housing 71 which carries the lens and prism assembly is preferably dropped downwardly from its central position as shown in Figs. 1 and 7 to a lower position as shown in Fig. 2, which brings the prism somewhat closer to the subject and also centers the image on the lower half of the focal plane of the camera, avoiding wastage of sensitized sheet material. The shutter housing is moved downwardly by releasing a suitable latch (not shown) and by turning the knob 101 (Fig. 18) to cause the associated pinions to travel down the rack 103 to move the shutter housing downwardly, the front of the camera remaining light-tight in either position because of a suitable light-tight slide arrangement of known form (not shown). The curtain 91 is operated to mask off the upper part of the focal plane.

When using the masking box as a supplementary support for the subject to be copied, the box is placed flat on its back on the board 81, that is, with the flange 157 of the masking box flat on the board 81, and with the front wall 155 of the masking box forming the top wall of the structure in this position. It is also centered carefully under the prism. To assist in such centering the flange 157 may be provided with two pins 171 (Figs. 9 and 20) permanently projecting therefrom and placeable in suitably located holes in the copy board 81. When the masking box is in use within the camera during the making of reduced size prints, these pins 171 simply project into clear space, as shown in Fig. 8, and do not interfere with any other parts.

On top of the masking box, when it is positioned on its back on the copy board, is placed a rectangular plate 173 (Figs. 5 and 20) of metal, for example, which rests on and substantially covers the wall 155 of the masking box, closing the opening in such wall and providing a smooth, flat, continuous supporting surface. Two pins 175 may be permanently mounted on the wall 155 and project upwardly therefrom, through holes in the plate 173, to locate this plate accurately on the masking box and prevent accidental lateral movement. The pins 175, like the pins 171, project into free space when the masking box is in use in the camera.

The copy or subject to be reproduced, such as one of the master sheets above mentioned, is laid flat on the plate 173, as indicated at 181 in Fig. 20. When the camera is to be used in making 400% enlargements of one single area out of a total of sixteen distinct picture areas on the sheet 181, as in the preferred operation of the miniature filing system above explained, it is desirable to provide a covering sheet over the sheet 181, to hold the sheet 181 flat and also to mask out all but the desired small area thereof. This covering sheet or mask is indicated at 183, and may be a duplicate of the sheet 173 except that it has an opening 185 at its center, which opening is rectangular and of a size to expose only one of the sixteen small areas on the master sheet 181. The plate 183 has holes which receive the pins 175 to maintain the plate accurately in place. The desired area to be copied from the sheet 181 is lined up with the window opening 185 by elevating one edge of the mask 183, if necessary, to permit touching and moving the sheet 181 in one direction or another. The window 185 remains always in the same location, centered directly under the prism 77.

The usual illuminating means adjacent the sides of the copy board 81 may be employed to illuminate, by reflected light, that portion of the sheet or subject 181 which shows through the window 185. The light rays pass upwardly from this portion of the sheet to the prism 77, thence rearwardly through the lens system and through the shutter (when the latter is open) and fall upon the sensitized sheet material which is now stretched over the front face of the supporting surfaces 45 and 51, from the roller 49 to the feeding rollers 53 and 55, in the normal focal plane of the machine, without using the focal plane extension element. Thus the desired enlarged print is made, at approximately four times the size or 400% of the size of the matter appearing through the window 185.

Just as in the case of making the 25% size prints, so also when making the 400% prints the lens and prism assembly used in standard photocopying procedure is replaced by the previously mentioned lens and prism assembly of shorter focal length.

If the master sheet or other subject being photographed is sufficiently thin and light-conductive, a better photographic reproduction can sometimes be obtained by illuminating the subject by light transmitted through it, rather than by light reflected from it. If the photographing operation is to be performed by the use of transmitted light rather than reflected light, the photographing operation proceeds in the same manner, except that the transmitted light holding element of Figs. 21 to 24 is used in place of the reflected light holding element of Figs. 19 and 20, and the lamps within this transmitted light holding element are lit, instead of lighting the large lamps standing beside the copy board.

This alternative holding element includes a box 201 of convenient size having suitable illuminating means within it, such as the incandescent lamp bulbs 203, and ventilating openings 205 for air circulation so that the interior will not become too hot. The top or cover 207 of the box is provided with a large cut-out or opening 209 glazed by a sheet 211 of light transmitting material, preferably of a diffusing character such as ground glass or other diffusing glass.

A frame 215 of a size similar to the box top 207 and having a window opening 217 of approximately the same size and shape as the opening 209, is hinged to one edge of the cover 207 by the hinges 219, the opposite edge of the frame 215 having a convenient finger piece 221 by which the frame may be lifted.

Fixed to the lower face of the frame 215 by suitable means such as screws 223, is a mask 225 made, for example, of strips of metal projecting a short distance inwardly beyond the inner edges of the opening 217, as seen in Fig. 23. The inner edges of these metal strips 225 define the maximum size of the opening or largest area which may be exposed to view at one time when using this form of subject holder. If a smaller area of the subject is to be photographed, one or another of a graduated series of supplemental masks may be used, with different sized openings.

These supplemental masks are of a form shown in Fig. 24, each comprising a plate 231 of opaque material such as metal, having an opening 233 of the required size and shape near its center, and also carrying a strip 235 affixed to the lower surface of the mask plate 231 immediately around the margins of the opening 233, as shown.

All of the supplemental masks of the series have plates 231 of the same external size, which size fits with slight play within the opening 217 of the frame 215, the edges of the plate 231 resting on and being supported by the inwardly projecting strips 225. The supplemental masks of the series have openings 233 of different sizes, however, so as to show through such openings the desired size and shape of the subject being copied. The strip 235 in each instance is of the same thickness as the strip 225, so that when a supplemental mask is in place as in Fig. 22, the strips 235 will bear firmly on the subject to be copied, immediately around the edges of the defined area thereof, thus holding the defined area firmly down into contact with the supporting translucent plate 211 around all sides of the defined area, keeping the subject flat.

In making the graduated series of supplemental masks, one may be made, for example, with the opening 233 of the size previously described for the opening 185 in the mask 183 of the previous form, so as to show or expose to view one of the sixteen rectangular areas of the master sheet. Another supplemental mask may be provided with an opening 233 of double this size in one dimension, but of the same size in the other dimension at right angles thereto. Still another mask may be provided with an opening 233 of double the dimension of the first mentioned mask in both directions, so as to show a block of four of the sixteen small areas on the master sheet. Other sizes may be provided for special purposes, as desired.

In using this alternative form of subject-holder, the proper supplemental mask 231 is placed in the opening of the frame 215, or no mask at all is placed there if an opening of maximum size is desired. The frame 215 is then lifted by an upward pull on the hand piece 221, and the subject to be copied is slid into place horizontally between the elevated frame 215 and the top 207 of the box. Then the frame 215 is lowered so that it rests on the subject, indicated at 241 in Figs. 22 and 23.

If the maximum area is desired and no supplemental mask is used, the strips 225 will bear on the subject 241 around all four edges of the area to be exposed, thus holding it flat on the translucent plate 211 around all sides. If one of the supplemental masks 231 is used, to show a smaller area, the same flat holding around all sides of the area will be accomplished by the strips 235 on the masks 231.

In either case, the subject 241 may be moved in one direction or another, as required to center the desired area in the mask opening, by slightly raising the frame 215, moving the subject 241 as required, and then lowering the frame again. The centering of the desired area with respect to the mask is facilitated if the lamps 203 are lit before the subject is placed in the holder.

The light from the lamps 203, passing first through the diffusing plate 211 and then through the thickness of the subject 241, illuminates the desired area of the subject in an effective and efficient manner for photographing purposes, particularly if the subject is a photographic print or photocopy which has been made on relatively thin stock. The use of a thin stock in making master sheets and similar copies for filing purposes is of two-fold advantage. First, it reduces the bulk of the file copies with respect to the bulk they would have if made on the usual thicker photographic print paper, and second, it enables sharp and clear reproductions of the master sheets to be made by this transmitted light method rather than by the reflected light which has heretofore been more commonly employed when making copies on commercial cameras or photocopying machines.

This form of subject holder may have downwardly projecting pins 245 (Fig. 22) serving in the same manner as the pins 171 of the previous form, to locate the holder on the copy board so that the window 217 or 223 will be properly centered beneath the prism 77.

*Operation—Reduced prints*

The operation of the apparatus in making reduced prints may be summarized as follows:

To prepare the machine for making prints of approximately 25% of the size of the originals, the magazine section 39 is swung back on its hinges 38 away from the section 37, to obtain access to the parts, and if the sensitized paper strip is already located in the normal focal plane, it is removed from such location by releasing the pressure on the feeding rollers 53 and 55, in known manner. Then the focal plane extension element consisting of the walls 113, 115, 117, 119 and associated parts is lifted into place, the headed studs 121 being thrust through the upper or enlarged parts of the keyhole slots 123 (Fig. 10) formed in the member 51, whereupon a slight downward movement of the focal plane extension element will move the shanks of these studs into the lower or smaller parts of the keyhole slots, completing the attachment of the extension element.

Then the latch 149 of the swinging mask 145 is released, and the mask is swung to an open position on its hinges 147. The strip of sensitized sheet material 141, issuing from the roll box over the roller 49, is then led forwardly and downwardly, over the roller 131, thence around the roller 137 and obliquely rearwardly to the roller 139, and thence is pulled downwardly and thrust between the feed rollers 53 and 55, pressure on which is temporarily released for this purpose. Then the pressure on the feed rollers is again applied, so that by turning the usual winding crank, these feed rollers may be rotated and may advance the film strip 141. The mask 145 is moved to its closed position and latched by the latch 149, and in this position it overlies the marginal edges of the sheet material and outlines or defines the exposure area of that part of the sheet material which is in the new or extended focal plane of the camera, between the rollers 131 and 137.

Either before or after these preparations of the focal plane extension element are completed, the masking box constituting the walls 151, 153, 155, etc., is installed by lifting it into place within the camera body 37, the rear end of which is open at this time because the magazine section 39 is swung open on its hinges. The masking box is so positioned that the keyhole slots formed in the flange 157 of the masking box engage over the headed studs 161 in the camera body 37, with the walls 153 extending forwardly into the place within the bellows 35. A slight downward movement of the masking box then firmly engages the keyhole slots with the studs, completing the positioning of the masking box.

The standard lens and prism assembly 75, 77 is removed by releasing the latch which holds this assembly on the front of the housing 71, and is replaced by a lens and prism assembly of shorter focal length. The housing 71, if not already in its upper position, is moved to this position so that it will be centered in front of the exposure area on the extended focal plane.

If the machine is not provided with focusing scales particularly designed for use with the extended focal plane and the lens of shorter focal length, the focusing screen 165 with the ground glass plate 167 may be placed in the opening of the masking box, as shown in Fig. 9, and then (the magazine section 39 still remaining open) the copy board 81 may be lowered to its desired low position, as shown in Fig. 1, and the camera body 37 may be moved horizontally back or forth along the rails 31 (by turning the knob 105) until the image of a subject placed on the board 81 is sharply focused on the ground glass plate 167. The focusing plate 167 and its frame 165 may then be removed from the camera. Use of the focusing screen is not necessary if the camera is equipped with scales especially designed for the focal plane extension element and the lens to be used therewith. In that case, the knob 105 is turned to move the camera body 37 to the proper position as indicated on a scale extending along one of the rails 31, and the crank 103 is turned to move the copy board 81 to its proper position as indicated on a scale extending along or parallel to one of the rails 85.

The magazine section 39 may now be swung forwardly on its hinges to closed position. Then the winding crank is turned to rotate the feed rollers 53 and 55 to feed a sufficient quantity of the sheet material 141 to eliminate that part which was exposed to light and fogged during the installation of the focal plane extension element and the masking box.

In carrying out the preferred operations of making master sheets for miniature filing, sixteen pages or documents to be copied, of approximately ordinary letter size, are laid on the copy-holder 81 in a regular and close arrangement, the edges of the respective sheets or letters touching or almost touching each other, as indicated by the small squares shown in perspective at 82 in the diagram constituting Fig. 3. If the parts have been properly positioned, the distance from the copy board 81 to the effective center of the lens system is approximately four times the distance from the effective center of the lens system to the strip of sensitized material 141 lying on the front of the member 115, so that the image formed on the sensitized strip 141 (when the shutter 73 is open) will be one-quarter the size or 25% of the size of the original subjects on the copy board 81. The shutter 73 is now opened for the necessary exposure time (adequate illumination of the subjects of the board 81 being provided) and, after the completion of the exposure and the closing of the shutter, the winding crank is rotated to turn the feeding rollers 53 and 55 to remove the exposed section of the film strip 141 from the focal plane and to bring a fresh unexposed portion into the focal plane, and the severing knife 57 is operated.

The relation of the principal parts when making a master sheet or print in the above described way is indicated diagrammatically in Fig. 3, where the sixteen documents on the copy board 81 are shown at 82, and where it is seen that they form sixteen images of 25% size on the film strip 141.

The photographed subjects on the board 81 are now removed and a fresh set of sixteen subjects are similarly arranged on the board 81, whereupon another exposure is made, the winding crank is operated to advance the film, and the severing knife is operated to cut it. The operations continue in this way, time after time, as often as desired.

It will be noted that there are always two exposure areas on the film strip between the knife 57 and the lower edge of the focal plane (slightly above the roller 137).

Hence, when the photographing procedure is started, the first two winding and cutting operations sever blank areas, and the first exposed area is wound down to a position below the knife by the third winding operation. When the last exposure of the day has been made, it is necessary to perform three successive winding and cutting operations in order to cut off the last of the exposed areas.

A master sheet made from sixteen sheets or pages of approximately letter size has the general appearance or arrangement diagrammatically shown in Fig. 6, where each of the sixteen reproductions is indicated by a separate rectangle. Of course, the master sheet is not limited to the reproduction of sixteen letter size pages, as it is possible to reproduce on a master sheet of about 8½ x 11 or 9 x 12 inches in size, any desired subject matter which can be placed on the copy board 81 within a rectangle of about 34 x 44 to 36 x 48 inches in size. For example, a drawing or map 36 x 48 inches in size may be laid on the copy board and reproduced in the form of a master sheet 9 x 12 inches in size.

The photographic paper used for making the master sheets may be of any desired grade or quality. It is frequently advisable to make the master sheets on what is called the transparent grade of photographic paper, this being a paper in which the photographic emulsion is coated on a thin and almost transparent paper base. The result is that when the print is developed and fixed, the black portions of the print are opaque but the white portions thereof are transparent, and the master sheet is therefore very suitable for making reproductions when illuminated by transmitted light, rather than reflected light, using the transmitted light subject-holder above described. Also, a master sheet made on this grade of paper is somewhat thinner than a master sheet made on the more usual or opaque grade of photographic paper, and thus takes up less room in the files.

*Operation—Enlarged prints*

The operation of the apparatus when making enlarged prints may be summarized as follows:

The focal plane extension element 113, 115, 117, 119 is removed from the camera, as also the masking box 153, 155. If the special short-focus lens and prism assembly used with the focal plane extension element is not already in place, the longer focus lens and prism assembly is removed and the short-focus assembly is mounted on the front of the shutter housing 71. The strip of sensitized sheet material is threaded in the usual manner common in machines of this type, directly downwardly from the roller 49, over the front surface of the focal plane support elements 45 and 51, to the feeding rollers 53 and 55, this arrangement being shown diagrammatically in Fig. 2.

Assuming now that a print of approximately 8½ x 11 inches in size is to be made from one-sixteenth of the area of one of the above described master sheets, at an enlargement of four times or 400%, it is advisable, in order to economize photographic print paper and to bring the lens closer to the subject, to move the shutter housing 71 downwardly by operation of the knob 101, from its central position on the camera front to its lower position, in which it is centered opposite the lower half of the focal plane support. The curtain 91 is so operated in known manner as to mask off the upper half of the sensitized sheet lying in the focal plane, so that stray light will not reach and fog it.

The camera back 37 is moved to the proper distance rearwardly from the front 33, and the copy board 81 is moved upwardly to a relatively high position such that when the special subject-holder is placed on top of this copy board, the subject will be at the proper distance from the prism 77 to give the desired enlargement. The positions of the copyholder and of the camera back are preferably determined by special scales mounted on the frame of the machine, but if such scales are not present, the usual ground glass focusing scale may be placed in the camera and it may be focused in this manner.

Assuming that the holder made up from the masking box is to be used, this masking box 151, 153, 155 is placed on its back on the copy board 81, in the manner shown in Fig. 20, with the pins 171 located in the holes on the copy board, so that the masking box is accurately centered under the prism 77. The plate 173 is placed on top of the masking box and located thereon by the pins 175. The master sheet 181 to be copied is placed on the plate 173, and the covering plate 183 is placed over it, also engaging the pins 175. The master sheet is moved in one direction or another as may be necessary to place the desired area which is to be reproduced so that it will show through the window 185 in the plate 183.

The lights alongside the copy board 81 are lit to illuminate by reflected light the portion of the master sheet which shows through the window 185. Then the camera shutter is operated to make an exposure in the usual standard manner, the position of the parts at this time being diagrammatically illustrated in Figs. 2 and 4. The small area of the master sheet which is exposed through the window 185 is reproduced as an enlarged print, four times the size of the exposed area of the master sheet, so that the finished print is back to the original size of the original document, assuming that the master sheet represents a quarter size or 25% size reproduction of the original document.

After the exposure is made, the exposed area is wound down from the focal plane by operation of the feeding rollers 53 and 55, and is cut off by operation of the knife 57, after which it is developed, fixed and finished.

If another area on the same master sheet 181 is to be reproduced, the sheet 183 is slightly raised along one edge so that the necessary access to the master sheet 181 can be obtained, and the master sheet is shifted in one direction or another as may be necessary to make the desired area line up with the window 185. Then another exposure may be made, to reproduce this desired part of the master member. When all of the desired areas of one master sheet have been reproduced, the next master sheet is substituted on the holder, and the desired area or areas of it are reproduced in the same manner.

If, instead of containing sixteen small reproductions, the master sheet contains a lesser number of larger reproductions, then the plate 183 is replaced by a different plate having a larger window 185 of the proper size to outline the desired area to be reproduced, and a larger area of the sheet material in the focal plane of the camera is used in making the print, the shutter housing 71 being moved upwardly to its central position on the camera front 33 if necessary, and the curtain 91 being operated to permit use of the entire focal plane area or such part thereof as may be needed.

If the master sheet has been made on the above mentioned transparent grade of photographic paper, then the second or transmitted-light form of subject-holder may be placed on the board 81, in place of the first or reflected-light form. Otherwise the photographing operation is the same.

While certain embodiments of the invention have been disclosed, it is to be understood that the inventive idea may be carried out in a number of ways. This application is therefore not to be limited to the precise details described, but is intended to cover all variations and modifications thereof falling within the scope of the appended claims.

We claim:

1. An attachment for a camera of the type including a lens and a normal focal plane support and means for holding a supply of sensitized sheet material in position to have successive portions thereof placed on said normal focal plane support, said attachment including an extension member detachably mounted on and extending forwardly from said focal plane support and a supplementary focal plane support carried by said extension member in position to have sensitized sheet material placed on said supplementary focal plane support for exposure in a location closer to said lens than is possible when placed on said normal focal plane support.

2. The combination with a commercial copying camera of the type including a normal focal plane support and means for holding sensitized sheet material on said support in position to be exposed, of a supplementary focal plane support, means for detachably supporting said supplementary support in said camera substantially entirely from said normal focal plane support, a partition detachably mounted in said camera independently of said normal focal plane support and having an opening alined with said supplementary focal plane support and margins around said opening overlapping said supplementary focal plane support, and means for holding sensitized sheet material on said supplementary support in position to be exposed to light passing through said opening in said partition.

3. A photographic camera including a body having means for holding sensitized sheet material in a normal focal plane, means exclusive of said first mentioned means for holding sensitized sheet material in a supplemental focal plane substantially parallel to and spaced a substantial distance from said normal focal plane, and means for holding a roll of sensitized sheet material in position to be supplied either to said normal focal plane or to said supplemental focal plane while said roll holding means remains stationary relative to and at a fixed distance from each of said planes.

4. A photographic camera including a body and a front movable toward and away from each other for purposes of focusing, means for holding a supply roll of sensitized sheet material, roller means in said body for guiding a web of sensitized sheet material from said roll across a normal focal plane, other roller means for guiding a web of sensitized sheet material from the same roll across a supplementary focal plane closer to said front than said normal focal plane, and means for interchangeably holding on said front either a lens of longer focal length for use with said normal focal plane or a lens of shorter focal length for use with said supplementary focal plane.

5. A photographic camera including a body and a front movable toward and away from each other for purposes of focusing, a wall within said body defining a normal focal plane, a second wall placeable in and removable from said body in a position between said first mentioned wall and said front to define a supplementary focal plane, means for holding a roll of sensitized sheet material in position to be supplied to either of said walls to lie in either of said focal planes, and means for interchangeably holding on said front either a lens of longer focal length for use in exposing sensitized sheet material in said normal focal plane or a lens of shorter focal length for use in exposing sensitized sheet material in said supplementary focal plane.

6. A photographic camera including a body and a front movable toward and away from each other for purposes of focusing, a wall within said body defining a normal focal plane, a guide roller approximately tangent to said focal plane near one edge thereof and a feeding roller approximately tangent to said focal plane near an opposite edge thereof, a compartment for holding a roll of sensitized sheet material in such position that said material may extend from said roll over said guide roller and along said normal focal plane to said feeding roller, a frame detachably mounted on said wall and extending therefrom in a forward direction toward said front, and a second wall carried by said frame in a position substantially parallel to and materially forwardly of said first mentioned wall, said second wall defining a supplementary focal plane adapted to be supplied with sensitized material extending from said guide roller to one edge of said second wall and from the opposite edge of said second wall to said feeding roller.

7. A construction as described in claim 6, further including another guide roller substantially offset from a straight path from said opposite edge of said second wall to said feeding roller and so placed that said sensitized sheet material may be threaded over said other guide roller to increase the length of the path followed by said sheet material between said opposite edge of said second wall and said feeding roller.

8. A photographic camera including a body and a front movable toward and away from each other for purposes of focusing, a wall within said body defining a normal focal plane, a second wall placeable in and removable from said body in a position between said first mentioned wall and said front to define a supplementary focal plane, means for holding a roll of sensitized sheet material in position to be supplied to either of said walls to lie in either of said focal planes, and a partition placeable in and removable from said body adjacent said second wall and cooperating with said second wall to act as a mask preventing access of stray light to portions of said sensitized sheet material rearwardly of said second wall, during the making of an exposure on sheet material located on said second wall.

9. A photographic camera including a hollow body, a transverse wall in said body defining a normal focal plane, a mask detachably mounted in said body a substantial distance forwardly of said normal focal plane, said mask having a central opening of substantially smaller area than the area of said normal focal plane, and a supplementary wall detachably mounted in said body in advance of said transverse wall in a location alined with and slightly rearwardly of said central opening of said mask, said supplementary wall defining a supplementary focal plane on which exposures may be made.

10. In a camera of the type including a detachable lens and a hollow body having within said body a normal focal plane support and means for holding sensitized sheet material in position to have successive portions thereof placed on said normal focal plane support for exposure thereon, the combination of an extension element detachably mountable within said body and including a supplementary focal plane support positioned materially forwardly of said normal focal plane support when said extension element is mounted within said body, said supplementary focal plane support being of smaller area than the interior cross sectional area of said hollow body in the plane of said supplementary focal plane support, and a mask element also detachably mountable within said body and cooperating with said extension element to block off access of light from said lens to said normal focal plane support.

11. In a commercial copying camera of the type including a detachable lens and light bending assembly, a subject holder extending approximately horizontally and alined approximately vertically below said assembly, and a hollow body having within said body a normal focal plane support extending approximately vertically and alined approximately horizontally behind said assembly, the combination of an extension element detachably mountable within said body and including a supplementary focal plane support positioned approximately parallel to and materially forwardly of said normal focal plane support when said extension element is mounted within said body, said supplementary focal plane support being of smaller area than the interior cross sectional area of said hollow body in the plane of said supplementary focal plane support, and a mask element also detachably mountable within said body and cooperating with said extension element to block off access of light from said assembly to said normal focal plane support, said mask element including a box-like structure adapted, when removed from said body, to be placed on said subject holder to form a supplementary support for holding a subject to be copied at an elevation relatively close to said assembly.

12. An attachment for a commercial copying camera of the type including an approximately horizontal subject holder, a lens, and a hollow body having within said body a normal focal plane support and a removable supplementary focal plane support in advance of said normal support and of smaller area than the interior cross sectional area of said hollow body in the plane of said supplementary focal plane support, said attachment including a hollow box-like structure having side walls and a front wall with a central opening therein and a marginal rear wall extending outwardly from the side walls, said structure being adapted to be placed within said camera body with said central opening alined with and in front of said supplementary focal plane support to serve as a mask obstructing passage of light from said lens toward said normal focal plane support around the edges of said supplementary focal plane support, said structure also being adapted, when removed from said camera body, to be placed on said subject holder to form a supplementary support for holding a subject in an elevated position above said subject holder.

13. In a commercial copying camera of the type including a lens and an approximately horizontal main subject holder mounted beneath said lens for upward and downward movement toward and away from said lens through a limited range of movement, the combination with said subject holder of an auxiliary subject holder of substantial height adapted to be placed on top of said main subject holder to hold a subject to be copied at an elevation closer to said lens than the highest elevation to which said main subject holder can be moved within its limited range of movement, said auxiliary subject holder including a supporting surface on which a subject may be laid, a mask frame to be superimposed over the subject, said mask frame having a central opening and inwardly projecting flanges around the sides of said central opening, and an auxiliary mask plate adapted to be placed within said central opening and to rest on and be supported by said inwardly projecting flanges, said auxiliary plate having a window opening of smaller area than said central opening in said mask frame.

14. A construction as described in claim 13, in which said auxiliary mask plate has sufficiently greater thickness immediately around said window opening than the thickness of the marginal portions resting on said projecting flanges so that the thicker portion of said mask around said window opening will rest on the subject while the marginal portions of said mask will be held above the subject by said inwardly projecting flanges on said frame.

PAUL LANDROCK.
ARTHUR W. CAPS.